United States Patent [19]
Sturmon

[11] Patent Number: 5,988,614
[45] Date of Patent: Nov. 23, 1999

[54] BUSHING FOR HEAVY VEHICLES

[75] Inventor: George R. Sturmon, St. Charles, Mo.

[73] Assignee: Atro Engineered Sytems, Inc., Cuba, Mo.

[21] Appl. No.: 08/937,706

[22] Filed: Sep. 25, 1997

[51] Int. Cl.⁶ .................................................. B60G 11/22
[52] U.S. Cl. ........................................... 267/292; 267/293
[58] Field of Search ............................... 267/52, 53, 260, 267/261, 269, 140, 292, 293

[56] References Cited

U.S. PATENT DOCUMENTS

| | | | |
|---|---|---|---|
| 3,332,701 | 7/1967 | Masser | 280/124.116 |
| 3,781,073 | 12/1973 | Jorn | 384/291 |
| 3,841,655 | 10/1974 | Schaeff | 280/124.16 |
| 3,933,367 | 1/1976 | Tamas | 280/680 |
| 4,048,370 | 9/1977 | Orkin et al. | 428/323 |
| 4,057,304 | 11/1977 | Gaines et al. | 384/125 |
| 4,166,640 | 9/1979 | Van Denberg | 280/124.116 |
| 4,541,646 | 9/1985 | Knowley | 280/851 |
| 4,840,395 | 6/1989 | Sturmon | 280/86.75 |
| 5,282,396 | 2/1994 | Crandall | 74/588 |
| 5,472,226 | 12/1995 | Bunker | 280/681 |
| 5,595,452 | 1/1997 | Hill et al. | 403/223 |

OTHER PUBLICATIONS

Euclid Industries, Inc., Catalog, Freightliner Front Suspension, pp. 5–18, (Mar. 12, 1990).
Euclid Industries, Inc., Catalog, Rockwell "T" Series 15" Dia. Steering Axle Brake, pp. 1–15, (Mar. 12, 1990).
Triangle Auto Spring Co., Catalog No. MHD–SUS–02, FLAGG Suspension Parts, vol. 2 International, Front Suspension Assembly, p. 17–23 (1996).
Engineering properties of Cyanaprene, American Cyanamid Company, Wayne, New Jersey 07470, 1985.
Harvey, S. R., "Polyurethane Elastomers", American Cyanamid Company, Wayne, N.J., 1973.
ATRO Engineered Systems, Inc. P.O. Box 29, HWYS P & 19, Cuba, MO 65453, Product Catalog 397, (Mar. 1997).

*Primary Examiner*—Chris Schwartz
*Attorney, Agent, or Firm*—Polster, Lieder, Woodruff & Lucchesi

[57] ABSTRACT

A substitute for a lubricated metal-on-metal bushing for mounting the spring eye of a heavy over-the-road truck includes a sleeve part and a pin, the pin having bonded to it a polyurethane elastomer with a 65 D Shore hardness. Similar bushings are substituted for other metal-on-metal bushings in the suspensions and brakes of heavy over-the-road vehicles.

32 Claims, 5 Drawing Sheets

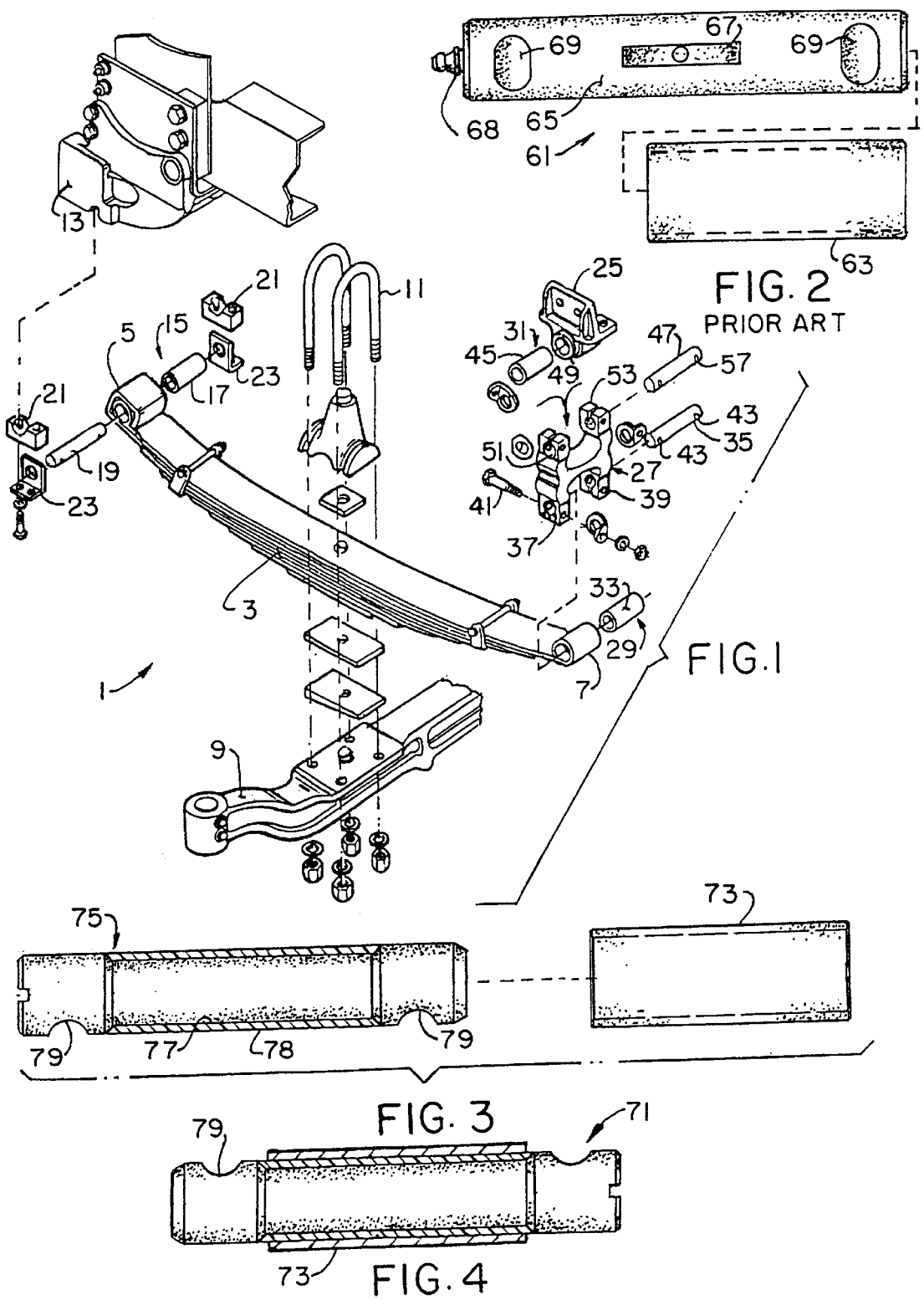

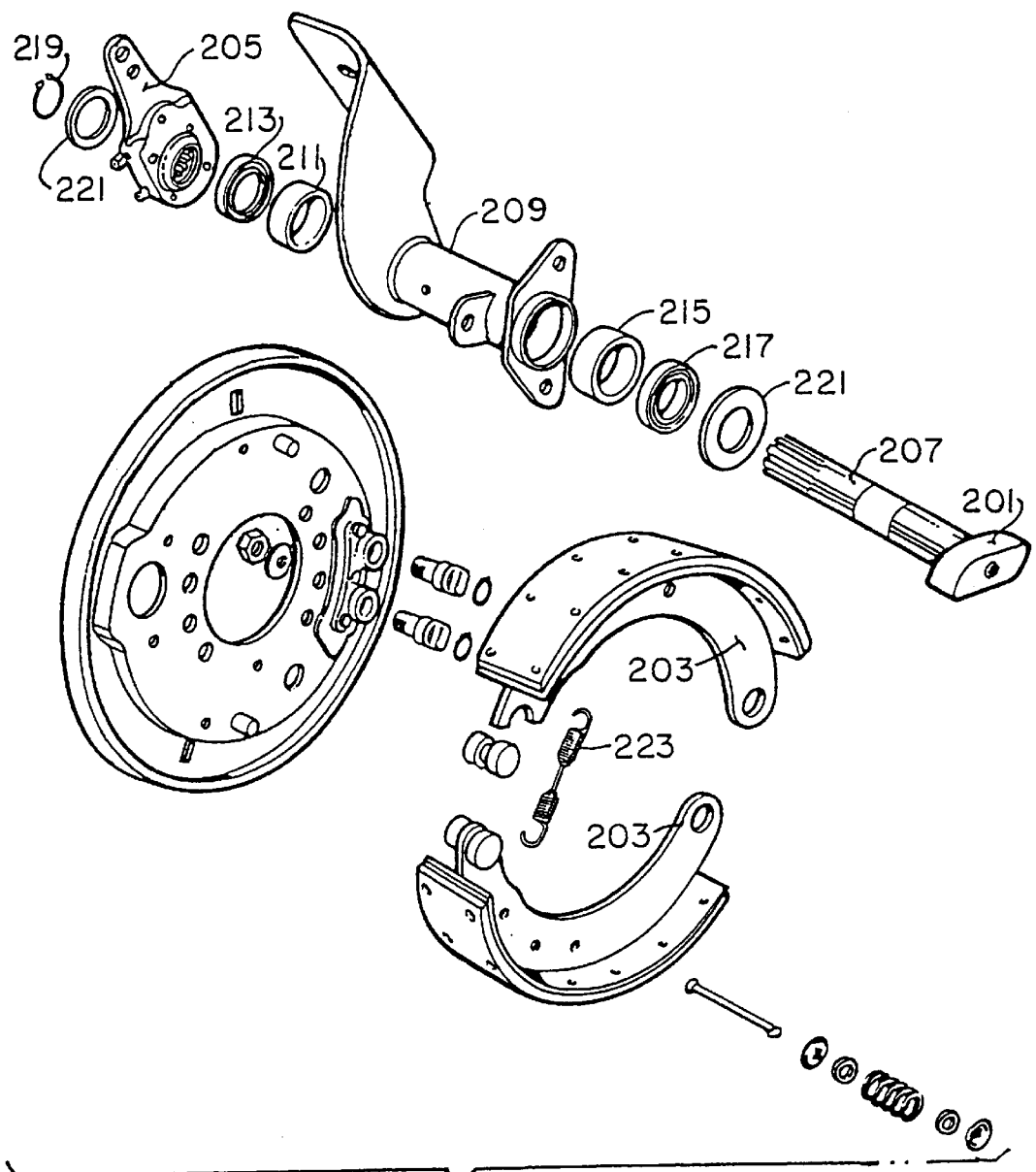
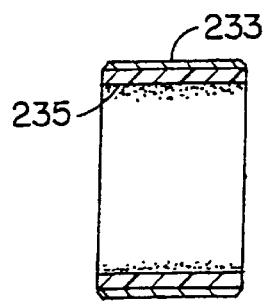
FIG.14
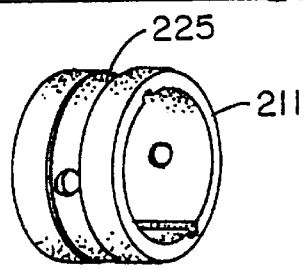
FIG.13
PRIOR ART
FIG.12

BUSHING FOR HEAVY VEHICLES

BACKGROUND OF THE INVENTION

This invention relates to bushings, and in particular to an improved bushing for use in heavy over-the-road vehicles. The invention is particularly directed to bushings which replace lubricated metal bushings for use in class 6, 7 or 8 vehicles having at least six thousand pound axle ratings.

Certain heavy vehicles, such as over-the-road trucks, utilize metal bushings in parts of their suspension systems. One such place is in the eye bushings at the ends of leaf springs of such vehicles, particularly on their front axles, as well as their rear axles. The bushing attaches the spring eye to other parts of the suspension or to the frame of the vehicle. Such bushings are not designed to provide cushioning of shock. They are generally formed of steel, brass or bronze, or some combination thereof. These bushings, however, require regular lubrication, or they will fail. Greasing the bushings requires taking the vehicle out of service and is therefore expensive. The grease itself also creates potential environmental problems. Even with regular maintenance, the bushings wear. Wear of the mating parts of the bushing not only leads to failure of the bushing, but reduction of control of the suspension and of the vehicle. The industry has therefore long sought an acceptable no-maintenance substitute for metal bushings, such as spring-eye bushings, of heavy over-the-road vehicles. Other metal bushings on such vehicles, such as steering link bushings and S-cam bushings for brakes, have similar problems.

Many existing spring eye bushings are held to the frame or chassis of the heavy over-the-road vehicle by removable side bars. These bushings may be installed as a unit by removing one of the side bars. Others, however, are installed in brackets by placing the outer sleeve portion between the arms of the bracket (generally by placing the sleeve in a spring eye and positioning the spring eye between the bracket arms), then inserting the pin through a hole in one of the bracket arms until it is seated in a hole in the other arm. In some such two-part arrangements, the pin is slid into the sleeve; in others, the sleeve and the pin are threaded, and the pin is screwed into the sleeve. Finding a substitute for either of these types of two-part metal bushings by known methods is particularly difficult.

My prior patent, U.S. Pat. No. 4,840,395, solved a long-standing problem with rubber bushings used in heavy vehicles such as trash trucks, off-the-road construction trucks, and the like. In those applications, the elastomeric bushings permit slight conical movement between the parts, cushion shock, permit slight temporary misalignment under loads, and provide freedom from the requirement for regular lubrication. My prior patent solved the long-standing problem of premature failure of rubber bushings by utilizing an improved polymeric elastomer, preferably a polyurethane having a hardness somewhat greater than the nominal hardness of the rubber it replaces, and by making one part of the bushing rotatable with respect to the elastomer while bonding the elastomer to the other part. Attempts to replace metal bushings in over-the-road heavy vehicles with polyurethane bushings, however, have not been successful.

No other acceptable substitutes for lubricated metal spring-eye bushings in heavy, over-the-road vehicles have been found. In some applications, seals may prolong the lubrication interval, but they add expense and complexity and do not eliminate the need for lubrication. More expensive roller bearings have been used and extend the life of the bushings, but they require special fittings and also require lubrication.

BRIEF SUMMARY OF THE INVENTION

One of the objects of the present invention is to provide an acceptable no-maintenance bushing for use in heavy-duty over-the-road applications where heretofore only lubricated metal bushings have been acceptable.

Another object is to provide such a bushing which can be directly substituted for an existing metal bushing.

Other objects will become apparent in light of the following description.

Applicant has observed that metal spring eye bushings must severely limit relative movement other than rotation, between the spring end and the structure to which it is attached, in order to provide proper handling of the vehicle, and they can allow conical movement between the parts of at most a few thousandths of an inch, or plus or minus one degree. Metal bushings require clearance between the outer sleeve of the bushing and the pin for the lubricating layer of grease and can maintain this degree of conical alignment only with difficulty when new and soon become looser.

Applicant has now concluded that the cause of the failure of his prior polyurethane bushings in the over-the-road heavy vehicles is that the rapid, high frequency (typically three to fifteen Hz), low-amplitude vibration to which the bushings are subjected over a continuous period of several hours produces heat. Heat builds up faster in polyurethane bushings than in metal, because of polyurethane's poor heat conducting properties, and the bushings fail.

In accordance with one aspect of the present invention, generally stated, a no-maintenance spring eye bushing for heavy over-the-road vehicles is provided comprising a metal outer sleeve which is mounted in the spring eye, an inner element extending through the outer sleeve and being mounted to the vehicle chassis, and an elastomeric interface between the outer sleeve and the inner element, the elastomeric interface having a hardness greater than 60 D, the elastomeric interface being bonded to one of the outer sleeve and the inner element and being rotatable with respect to the other of the outer sleeve and the inner element The term "interface" is used herein as it is used in my U.S. Pat. No. 4,840,395 to indicate a material which is interposed between the outer sleeve and inner element.

The inner element of the spring eye bushing preferably comprises a pin mounted in brackets embracing the axial ends of the outer sleeve of the bushing. The pin is typically about 1" to 1.5" in diameter.

Preferably, the elastomeric interface is a polyurethane material. As used herein, except as otherwise indicated, the term "polyurethane" includes polyurethanes, polyureas, and blends thereof. The elastomer preferably has a hardness in the range of 60 D to 80 D, a tensile strength of at least 4,000 psi, a tear (die C) strength of at least 525 pli, a 100% modulus of over 2,500, and an ultimate elongation of at least 100%. An ultimate elongation in the range of 100% to 300% is preferred. The preferred polyurethane material has a hardness of about 65 D. It responds much like a metal, maintaining substantial conical alignment (±1°) of the outer sleeve and inner element and returning rapidly to its unstressed configuration.

Preferably the elastomeric interface is bonded to the inner element, rather than the outer sleeve, so as to provide the largest bearing area and reduce stress and deformation of the bushing under load. This approach also helps maintain the bond if the elastomer shrinks during cure.

The improved bushing will provide a service life comparable to, or longer than, standard lubricated metal bushings, and does not require maintenance. It provides excellent alignment and control in front axle applications.

In accordance with another aspect of the invention, a replacement bushing is provided for replacing a metal-on-metal bushing for heavy over-the-road vehicles, the metal-on-metal bushing comprising a metal outer sleeve and a metal inner element telescoped into the outer sleeve, the inner element having an outer bearing surface separated from an inner bearing surface of the outer sleeve by a film of grease. The replacement bushing has an outer sleeve, an inner element, and an elastomeric interface with a hardness greater than 60 D, the interface being bonded to one of the inner element and outer sleeve and being rotatable with respect to the other of the outer sleeve and inner element The interface has an outer diameter substantially equal to the maximum diameter of the inner element of the metal-on-metal bushing. Because the interface of the improved bushing is an elastomer, the fit between the elastomer and the metal element against which it rotates can be tighter than the fit between the corresponding metal parts of the metal-on-metal bushing it replaces, although in the preferred embodiment the mating diameters of the pin and sleeve are the same as their metal-on-metal counterparts. Thus, the elastomer bonded to the inner element or pin typically has a diameter equal to the inner diameter of the outer sleeve, and is toleranced to be up to about 0.005" smaller than the smallest diameter within tolerance range of the inner diameter of the outer sleeve. In one embodiment, the outer sleeve and inner element of the metal-on-metal bushing are threaded, and the replacement bushing includes an inner element having a portion with an outer diameter substantially equal to the root diameter of the thread on the inner element of the metal-on-metal inner element, and the outer sleeve of the replacement bushing has an inner diameter substantially equal to or somewhat less than the root diameter of the thread on the outer sleeve, the elastomeric interface filling the space between the inner element and the outer sleeve. In another embodiment, the inner element of the metal-on-metal bushing slides axially into outer sleeve, and the replacement bushing includes an inner element which is cut away in its central portion to provide a channel for the elastomeric interface. In this embodiment, the elastomer has an outer diameter substantially equal to, or slightly larger than, the outer diameter of the corresponding part of the inner element of the metal-on-metal bushing and is preferably bonded to the inner element.

The elastomeric interface of the present invention can be, and preferably is, thinner than the interface of my prior U.S. Pat. No. 4,840,395, which is generally greater than 0.375". The interface of the present invention is preferably less than 0.3" (12 mm) thick, most preferably in the range of 0.1" to 0.25" (4–10 mm) thick.

Other aspects of the invention will become apparent in view of the following description and claims.

BRIEF DESCRIPTION OF THE SEVERAL VIEWS OF THE DRAWINGS

In the drawings,

FIG. 1 is an exploded view in perspective of a front-end, leaf spring suspension of a heavy over-the-road vehicle, with spring eye bushings at the ends of the leaf spring, suitable for use with the present invention.

FIG. 2 is a bottom plan view of a disassembled prior art metal-on-metal spring eye bushing for use in the suspension of FIG. 1.

FIG. 3 is a view in side elevation, partially cut away, of a disassembled spring eye bushing of the present invention, suitable for replacing the bushing of FIG. 2 in the suspension of FIG. 1.

FIG. 4 is a view in cross-section of the assembled spring eye bushing of FIG. 3, in an inverted position.

FIG. 12 is an exploded view in perspective of a steering axle brake for a heavy over-the-road vehicle, with S-cam bushings suitable for use with the present invention.

FIG. 13 is a view in perspective of a prior art metal S-cam bushing for use in the steering axle brake of FIG. 12.

FIG. 14 is a view in cross-section of an S-cam bushing of the present invention, suitable for replacing the bushing of FIG. 13.

DETAILED DESCRIPTION OF THE INVENTION

Figure 5:
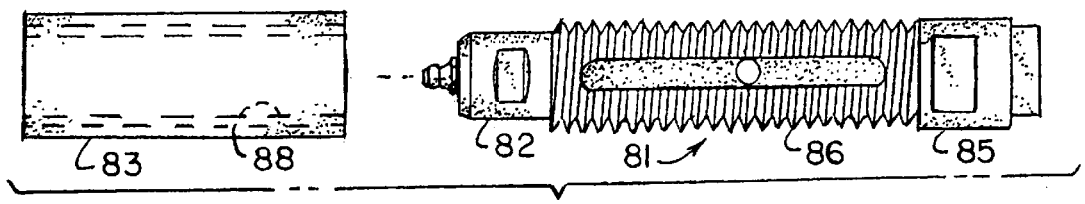
FIG. 5 is a bottom plan view of a disassembled prior art metal-on-metal spring eye bushing for use in a common modification of the suspension of FIG. 1, the bushing including threaded parts.

Referring now to the drawings, FIG. 1 represents a front suspension system 1 for the steering axle of a heavy (Class 6, 7 or 8) over-the-road truck. The illustrative system is for a truck manufactured by Freightliner Corporation. The system 1 includes a leaf spring assembly 3 having a first spring eye 5 at one (forward) end and a second spring eye 7 at its other. The center of the leaf spring assembly 3 is held to the front or steering axle 9 by a saddle and U-bolt assembly 11.

The first spring eye 5 is mounted to a cast spring hanger or saddle 13 on the chassis of the truck by means of a spring eye bushing 15. The spring eye bushing 15 includes an outer sleeve 17, which is tightly frictionally gripped by the spring eye 5, and a pin 19, which is slipped axially through the sleeve 17 after the sleeve has been spot welded or chemically bonded in the spring eye 5. The ends of the bushing pin 19 are held in the spring saddle 13 by bottom plates or caps 21, which are bolted to the upper part of the spring saddle 13. Shims 23 position the spring eye 5 in the spring saddle 13 and limit axial play of the spring eye along the axis of the bushing 15.

The second spring eye 7 is mounted to a second cast spring hanger 25 by means of an H-shaped cast spring shackle 27, a second bushing 29, and a third bushing 31. The second bushing 29 and third bushing 31 are identical to the first bushing 15. The second bushing 29 includes an outer sleeve 33, which is tightly frictionally gripped by and adhered in the spring eye 7, and a pin 35. Shackles 37 in the lower legs 39 of the cast spring shackle 27 embrace the ends of the second spring eye 7, and pin 35 extends through the shackles 37 and the sleeve 33. Shackle bolts 41 extend through the cross bores of the shackles 37 and clamp the ends of the pin 35. The shackle bolts 41 also extend through transverse depressions 43 in the ends of the pin 35 to prevent rotation of the pin 35 with respect to the spring shackle 27. The third bushing 31 includes an outer sleeve 45 and a pin 47. Outer sleeve 45 of the third bushing 31 is press fit into a bore 49 of the second spring hanger 25. Shackles 51 in the upper legs 53 of the H-shaped cast spring shackle 27 embrace the ends of the bore 49 in the second spring hanger 25, and pin 47 extends through the shackles 51 and the sleeve 45. Shackle bolts extend through the cross bores of the shackles 51 and clamp the ends of the pin 47; the shackle bolts also extend through transverse depressions 57 in the ends of the pin 47 to prevent rotation of the pin 47 with respect to the spring shackle 27. The use of bushings 15, 29, and 31 for mounting the spring eyes 5 and 7 permits rotation of the spring eyes with respect to the chassis of the truck as the spring flexes and further permits rotation of the cast spring shackle 27 to accommodate the change in length of the spring as it flexes. It is essential to control of the truck that the bushings provide smooth rotation of the pin within the bushing sleeve and that the pin be maintained coaxial with the sleeve, allowing neither translation of its axis in excess of a few thousandths of an inch, preferably less than ten thousandths (0.010"), nor significant conical movement, preferably no more than about one degree (1°).

It will be seen that it is possible to assemble the first bushing 15 before the lower caps 21 are mounted to the spring hanger 13. The pin 33 of the second bushing 29, however, must be inserted after spring eye 7 is positioned between the lower legs 39 of the cast spring shackle 27, and the pin 47 of the third bushing 31 must be inserted after second spring hanger 25 is positioned between the upper legs 53 of the cast spring shackle 27.

Each bushing is shimmed appropriately to provide proper end play of the bushing sleeve, hence of the spring end.

The suspension as thus far described is a well-known, conventional suspension.

In presently known suspensions, the bushings 15, 29, and 31 are lubricated metal-on-metal bushings, as shown in FIG. 2. The conventional bushing 61 includes a metal sleeve 63 and a metal pin 65, separated by a film of grease. The sleeve 63 is 4.0" long, with an outer diameter of 1.500" and an inner diameter of 1.249±0.001". The pin is 6.875" long, with an outer diameter of 1.2445±0.0015". A small flat 67 on one side of the pin 65 provides a lubricant reservoir. Transverse indentations 69 permit locking the rotational position of the pin 65 as described above. A conventional grease fitting 68 permits periodic lubrication of the bushing 61. In practice, the bushings must be lubricated every ten to fifteen thousand miles.

In accordance with one illustrative embodiment of the present invention, the conventional metal-on-metal bushing 61 of FIG. 2 is replaced in the suspension of FIG. 1 with the improved bushing 71 of FIGS. 3 and 4. The improved bushing 71 includes a sleeve 73 which may be identical with the conventional sleeve 63. Preferably, the sleeve 73 is an AISI 1020/1026 drawn-over-mandrel steel tube, with an outside chamfer at its ends to facilitate inserting it into a spring eye or spring hanger. The improved pin 75 has dimensions and shape identical with those of the conventional pin 65, but it is formed differently. The pin 75 is made of SAE 1144 stress proof steel, machined at its center to form a reduced diameter channel 77 which is 4.250" in overall length and 1.000" in diameter. The ends of the channel 77 are beveled at a 45° angle, making the length of the channel, at its bottom, 4.004". To the channel 77 is bonded a layer 78 of polyurethane having a hardness of at least 60 D and an ultimate elongation of between 100% and 300%. Bonding is carried out in a conventional manner, preferably utilizing Thixon® 423 (Morton International, Inc.). The polyurethane layer 78 is preferably cast on the pin in a mold, using a conventional release agent such as Synlube 1000, a silicone-based release agent from Synair Corporation, Chattanooga, Tenn. The polyurethane is machined to a final diameter equal to the diameter of the conventional pin 65.

The preferred polyurethane is formed from an MDI-based polyether quasi prepolymer, extended with an ether polyol, aromatic amine curative blend, such as an ETHACURE® curative from Albemarle Corporation, Baton Rouge, La., with or without an appropriate catalyst. The material cures in a short period, with a gel time on the order of twenty seconds, to form a metal-like material having a Shore hardness of 65 D. The preferred material is sold by ITWC, Inc., Malcolm, Iowa, as its E65D polyurethane. The quasi prepolymer is sold by the same company under the designation "QZ-22." The E65D material has a tensile strength of about 6,400 psi, a tear (split) strength of 175 pli, a 100% modulus of about 3,500 psi, a 200% modulus of about 5,100 psi, and an ultimate elongation of about 270%.

When bushings using the preferred E65D polyurethane interface were tested under load at 3 Hz and 15 Hz vibration, at room temperature ambient conditions, it was found that the temperature of the material rose to about 125° F., then remained at that temperature. By contrast, when similar bushings with polyurethane interfaces having a hardness below 55 D were tested, the temperature of the material continued to rise.

Preliminary tests of the bushings 71 under six thousand pound load for one million cycles showed no significant wear of the bushings. This suggests that the bushings will last upwards of 500,000 miles of use without maintenance.

The bushings 71 are installed exactly like the bushings 61. Shims and shackle bolts are installed in the same conventional manner. Once the improved bushings 71 are installed, however, they need no maintenance and are believed to have a life at least as long as a properly maintained metal-on-metal bushing. They provide exceptional wear resistance and alignment of the pin and sleeve, hence excellent handling of the truck.

Referring now to FIG. 5, a modified conventional bushing 81 is shown which is often substituted for the bushing 61 in the suspension of FIG. 1, particularly for use on the West Coast of the United States. This modified bushing differs from the bushing 61 in that one end 82 of the pin 85 is made smaller in diameter, and in that a thread 86 is cut into the central portion of the pin. The sleeve 83 is given a correspondingly smaller inner diameter, with a corresponding female thread 88 cut into the inner surface of the sleeve. In this modification, the size of the openings in the mounting shackles is different on opposed sides of the first hanger bracket 13 and on opposed sides of the H-shaped cast spring shackle 27. The pin can thus be inserted from only one side, the shackle opening on the opposed side being sized to accept only the small end 82 of the pin 85. The thread on each part is 0.125" deep. The sleeve portion 83 of the bushing 81 in positioned in the same way as the sleeve 53 of the first conventional bushing 51, but the pin is threaded into the sleeve, rather than being slid axially into it. Because the threads limit axial movement of the pin 85 in the sleeve 83 when the pin has been secured and pinned in the shackles, this arrangement eliminates the need for shims.

Figure 6:
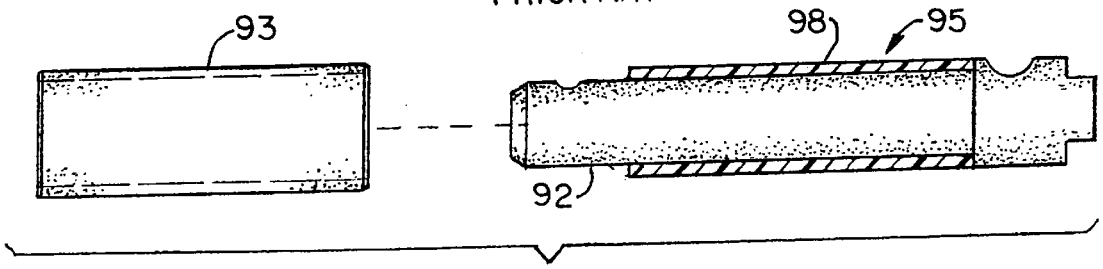
FIG. 6 is a view in side elevation, partially cut away, of a disassembled spring eye bushing of the present invention, suitable for replacing the bushing of FIG. 5 in the suspension of FIG. 1.
Figure 7:
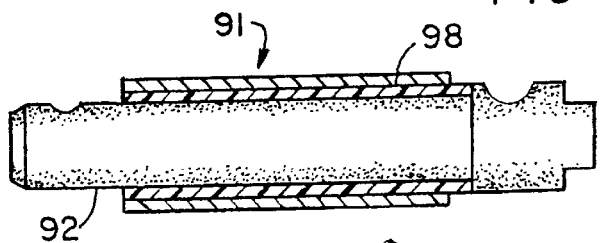
FIG. 7 is a view in cross-section of the assembled spring eye bushing of FIG. 6.

As shown in FIGS. 6 and 7, in accordance with the present invention an improved bushing 91 may substitute for the bushing 81. The bushing 91 includes a sleeve 93 and a pin 95. The sleeve 93 is identical with the sleeve 73. In effect, the sleeve 93 is the sleeve portion 83 of the conventional bushing of FIG. 5, with the threads 88 milled out to their root. The metal pin 95 is identical in size and shape with the pin 85, except that the outer diameter of its central portion is equal to the root diameter of the thread 86. A polyurethane layer 98 is formed of the same material as layer 78 of FIGS. 3 and 4 and is bonded to the metal pin 95 in the same manner as the layer 78 of FIGS. 3 and 4. The layer 98 has a length 0.125" greater than the width of the spring eyes 5 and 7. As shown in FIG. 7, it extends axially only to the end of the sleeve 93 adjacent the small end 92 of the pin 95, and is therefore shorter than the thread 86 of the conventional threaded pin. This is because the bushing 91 must be shimmed to provide proper axial positioning of the spring eye with respect to its hangers. The central portion of the pin 95 has a diameter of 0.994±0.005" and the polyurethane layer 98 has an outer diameter of 1.247±0.001". The layer is thus about 0.127" thick. The polyurethane of this embodiment is the same E65D material as the first embodiment, applied in the same way.

Figure 8:
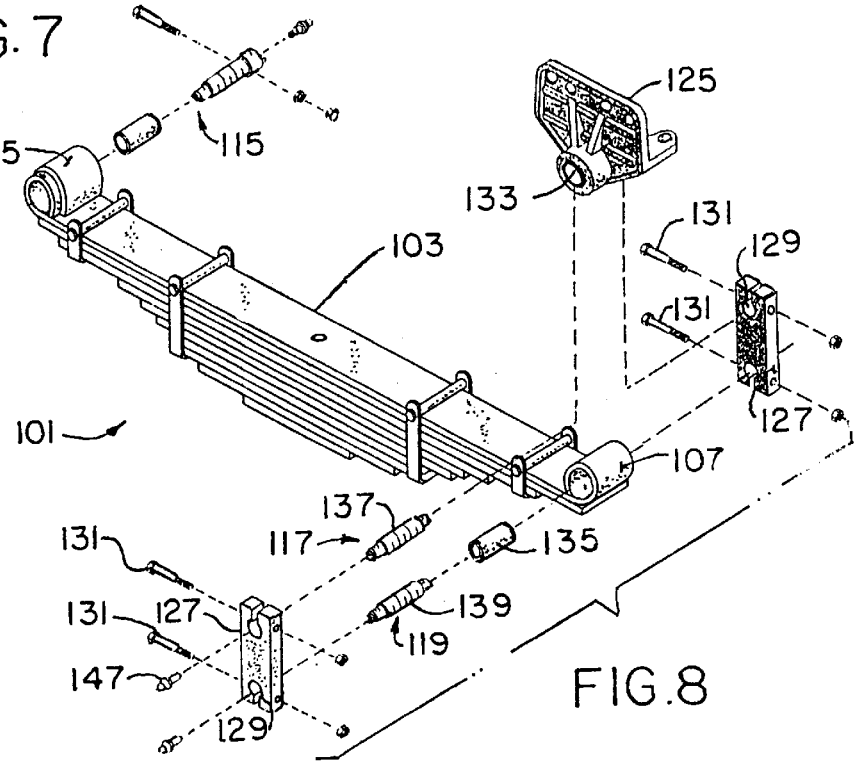
FIG. 8 is an exploded view in perspective of another front-end, leaf spring suspension of a heavy over-the-road vehicle, with spring eye bushings at the ends of the leaf spring, suitable for use with the present invention.

FIG. 8 illustrates another type of front axle suspension 101 for a heavy over-the-road truck, in this case a Navistar Corporation International® truck. The suspension is shown using conventional metal-on-metal spring eye bushings. The suspension 101 includes a leaf spring assembly 103 having a first spring eye 105 at one end and a second spring eye 107 at its other. The center of the leaf spring assembly 103 is held to the steering axle in a conventional manner.

The spring eyes 105 and 107 are mounted to the truck frame by threaded bushings 115, 117 and 119. The first threaded bushing 115, holding the first, forward, end of the spring 103 is similar to the threaded bushing 81 of FIG. 5. The second spring eye 107 is mounted to a cast spring hanger 125 by means of two side bars 127, having shackles 129 at their upper and lower ends, the second bushing 117, and the third bushing 119. The second bushing 11 7 and third bushing 119 differ from the threaded bushing 81 in that the ends of their pins are of smaller diameter than the diameter of their threaded central portions, as shown in more detail in FIG. 9. Therefore, the pins must be threaded into their sleeves before the side bars 127 are attached and shackle bolts 131 are tightened. The sleeve 133 of the bushing 117 is force fitted into, then welded or adhered to, the cast spring hanger 125. The sleeve 135 of the third bushing 119 is fitted into the spring eye 107 and welded or adhered to it. The pins 137 and 139 of the second and third bushings are then threaded into their respective sleeves, and the side bars 127 fitted onto the ends of the pins and bolts 131 tightened.

Figure 9:
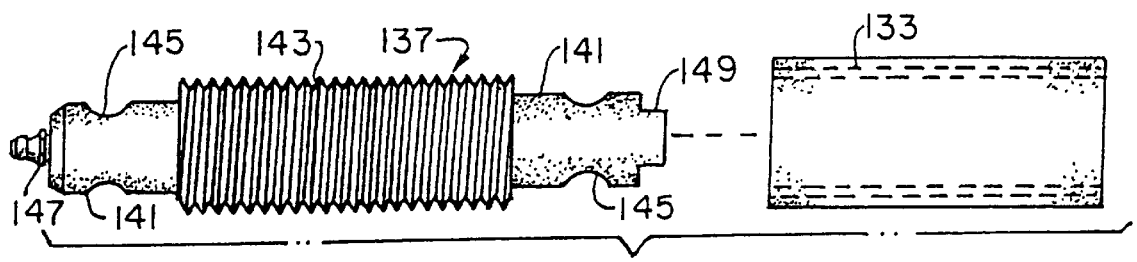
FIG. 9 is a view in side elevation of a disassembled prior art metal-on-metal spring eye bushing for use in the suspension of FIG. 8.

As shown in more detail in FIG. 9, the conventional bushing 117 includes an interiorly threaded sleeve 133 and an exteriorly threaded pin 137. The ends 141 of the pin 137 are smaller in diameter than its central threaded portion 143.

The threads 143 have a depth of about 0.25" Transverse indentations 145 permit shackle bolts 131 to lock the rotational position of the pin 137 with respect to the side bars 127. A conventional grease fitting 147 is provided in one end of the pin 137 to permit periodic lubrication of the bushing, and a conventional wrench fitting 149 is provided at the other end.

Figure 10:
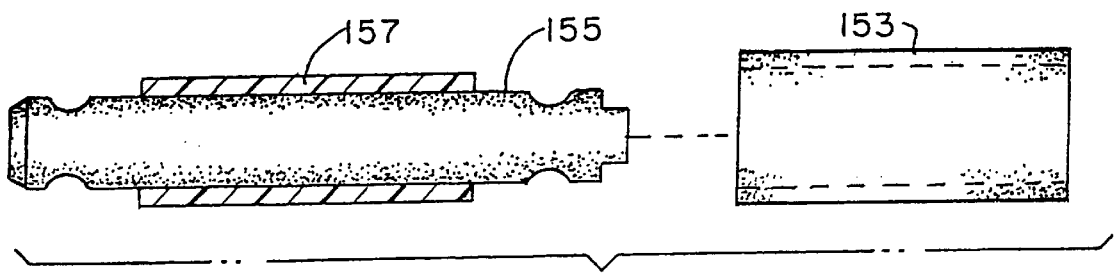
FIG. 10 is a view in side elevation, partially cut away, of a disassembled spring eye bushing of the present invention, suitable for replacing the bushing of FIG. 9 in the suspension of FIG. 8.
Figure 11:
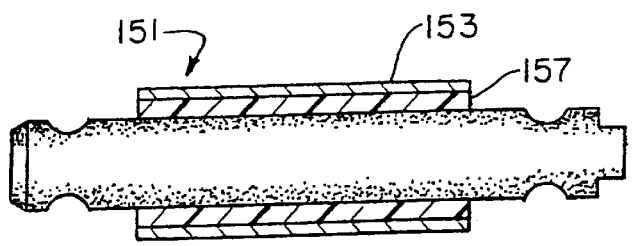
FIG. 11 is a view in cross-section of the assembled spring eye bushing of FIG. 10.

In accordance with another embodiment of bushing of the present invention, the bushing 115 is replaced with a bushing like the bushing 91 of FIGS. 6 and 7, and the bushings 115 and 117 are replaced with a bushing 151 as shown in FIGS. 10 and 11. The bushing 151 includes a sleeve 153 having outer dimensions equal to the dimensions of the sleeve 133: 4.0" long and 1.765" in diameter. To give the sleeve sufficient compressive strength, the inner diameter of the sleeve is 1.501±0.001", somewhat less than the root diameter of the internal thread of the sleeve 133. The bushing also includes a metal pin 155 having the dimensions of the pin 137 with the threads 143 milled flat. The metal pin 155 has an outside diameter of 1.062±0.005". The sleeve 153 and pin 155 may be made of the same materials as the sleeve 73 and pin 75 of the first embodiment. A layer of polyurethane 157, of the same E65D type used in the first embodiment 71, is cast on, and bonded to, the central portion of the pin 155, using the techniques previously described. The polyurethane layer 157 has the same length as the sleeve 153. It has an outer diameter of 1.499±0.001". It will thus be seen that the layer 157 has a thickness of about 0.22".

The bushing 151 is installed between side bars like the bushing 137, but requires the use of shims to provide axial positioning. Once installed, however, it does not require the regular service needed by the bushing 137 and, like the bushing 71, provides resistance to deflection from axial concentricity and to conical movement which are equal to or better than the metal-on-metal bushing it replaces.

FIGS. 12–14 illustrate the application of the present invention to replacing the metal-on-metal bushings for the brake S-camshaft of a heavy truck .. This arrangement is shown in FIG. 12, for a Rockwell steering axle brake. The S-cam 201 spreads the brake shoes 203 in response to rotation of a slack adjuster 205, thereby applying the brakes. The camshaft 207 is rotatably supported on the axle by a hanger tube 209 which carries on its proximal end a first bushing 211 and seal 213 and on its distal end a second bushing 215 and seal 217 identical with the bushing 211 and seal 213. Lock ring 219 and spacer washers 221 complete the S-cam assembly. The bushings 211 and 215 must permit free rotation of the camshaft, both in applying the brakes under great, chattering loads and in permitting the brakes to return to their inoperative position under the light load of a spring 223. This requires precise alignment of the bushings 211 and 215 and also the ability to endure repeated stops without substantial wear. A conventional S-cam bushing 211 is shown in FIG. 13. The bushing has an outside diameter of 2.00" and an inside diameter of 1.625±0.002". An annular groove 225 provides a reservoir for grease, and seal 213 impedes the loss of grease.

In accordance with the present invention, the bushing 211 and seal 213 are replaced by an improved bushing 231. The bushing 231 includes a metal sleeve 233 in the form of a 2.000" outer diameter, DOM tube having a wall thickness of 0.065". Bonded to the interior of the tube 233 is a layer 235 of E65D polyurethane. The polyurethane layer 235 has an inner diameter of 1.625±0.002", giving it a wall thickness of about 0.123". The bushing sleeve and polyurethane lining have a length of about 1.250". Comparative tests of conventional bushings 211 made of bronze and powdered metal respectively with a bushing of the present invention show that after two hundred fifty thousand cycles, the bronze bushing has worn about 0.025", the powdered metal bushing has worn about 0.033", and the bushing of the present invention has worn about 0.003".

Figure 15:
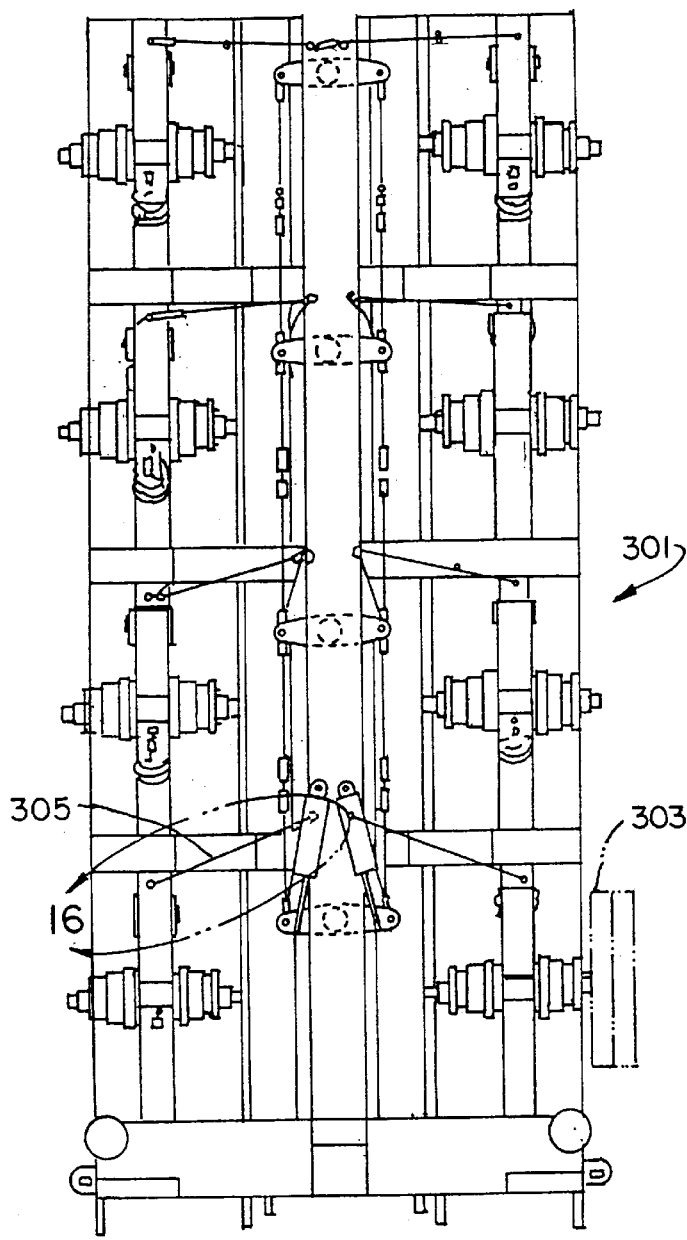
FIG. 15 is a fragmentary top plan view of an over-the-road carrier for carrying military tanks, the carrier having steering link bushings suitable for use with the present invention.
Figure 17:
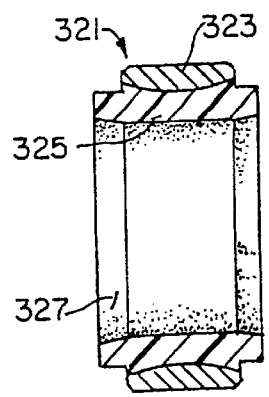
FIG. 17 is a view in cross-section of an assembled steering link bushing of FIG. 16 in accordance with the present invention.
Figure 18:
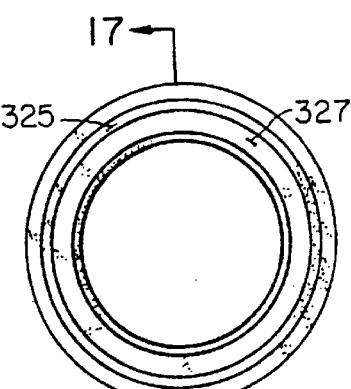
FIG. 18 is a view in end elevation of the bushing of FIG. 17.
Figure 16:
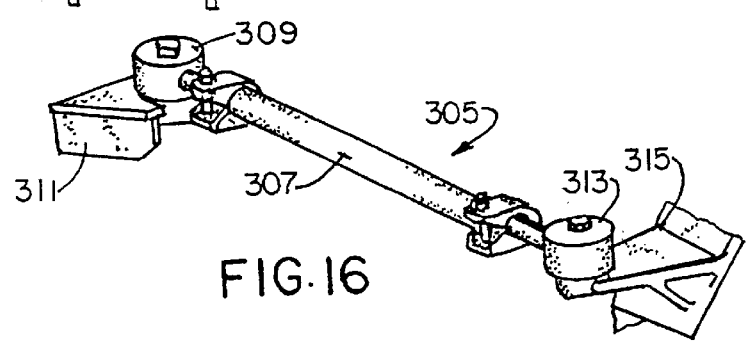
FIG. 16 is a view in perspective of a steering link of the tank carrier of FIG. 15.

Another application of the present invention is in the steering links of a heavy multi-wheeled carrier for transporting an M1000 tank. Such a carrier is manufactured by Systems & Electronics, Inc., St. Louis, Mo. The carrier 301 is shown schematically in FIG. 15. The carrier 301 has multiple pairs of dual wheels 303 joined by steering linkages 305 in an Ackerman geometry with respect to the succeeding pair of wheels. One of the steering linkages 305 is shown in FIG. 16. The linkage 305 includes an arm 307 mounted by a bushing 309 at one end to a triangular plate 311 rotatably mounted on the frame of the carrier. The other end of the arm 307 is mounted by a bushing 313 to a scissors bracket 315 which carries a wheel of the carrier. The bushings 309 and 313 are identical. Each is mounted on a two-inch diameter steel dowel pin. Because of the great weight of the carrier and its cargo, the steering linkage bushings 311 and 315 must bear substantial loads. Originally, the bushings were tapered roller bushings which were expensive to purchase and to maintain. Attempts were made to replace the bushings with the bushing described in my prior U.S. Pat. No. 4,840,395, but those bushings failed. It has now been found that bushings 321 as shown in FIGS. 17 and 18 provide highly satisfactory performance. The bushing 321 includes a sleeve 323 having bonded thereto a polyurethane ring 325 made of E65D polyurethane. The inside of the sleeve 321 is beveled to provide a mechanical interlock for the polyurethane. A radially inner portion 327 of the polyurethane ring 325 extends axially beyond the ring about 0.250" in each axial direction. The inside of the polyurethane ring is chamfered to permit easy insertion of the 2" dowel pin. At its center, the polyurethane ring is 1.960±0.002" in diameter. The polyurethane is thus slightly smaller than the dowel, and the bushings must be forced over the dowel. Nonetheless, the bushing provides smooth turning of the wheels and reliable service without maintenance.

Numerous variations in the bushing of the present invention, within the scope of the following claims, will occur to those skilled in the art in light of the foregoing disclosure. Merely by way of example, other polyurethanes and/or polyureas may be utilized, so long as they have the requisite strength and hardness characteristics. Other types of elastomers may be usable, although they are not presently known to the inventor. The spring eye bushings and other bushings may be made with the polyurethane on the pin slightly larger than the opening in the bushing sleeve, although this approach requires more effort to install the bushing.

In the spring eye bushing, the polyurethane can be bonded to the sleeve rather than the pin, although this approach has several drawbacks, among which is that in order to interchange the improved bushing for an existing conventional metal-on-metal bushing may require a sleeve which is too thin to stand up to being forced into a spring eye which may not be perfectly sized or shaped. Bonding the polyurethane to the sleeve also means that as the elastomer cures and shrinks it tends to pull away from the metal surface rather than clinging more tightly to the pin, and further means that the sleeve must be adhered to the spring eye rather than welded because of the danger of melting the elastomer. Perhaps most importantly, it reduces the surface area subjected to maximum stress from the relatively large surface of the sleeve to the relatively small surface of the pin.

A threaded bushing can be made in accordance with the present invention by cutting an annular channel in the pin (as in the first embodiment) to provide axial support, casting a polyurethane layer on the pin with a diameter as large as the outer diameter of the threads on the conventional threaded pin, then cutting the threads into the polyurethane. The threads can also be cast in the polyurethane. This approach may require the use of reinforcing fibers in the polyurethane.

These variations are merely illustrative.

What is claimed is:

1. A bushing adapted to be fitted in the eye of a leaf spring in a heavy, over-the-road vehicle, the bushing comprising an outer sleeve having an outer surface adapted to fit in the leaf spring eye, an inner element telescoped into the outer sleeve, and an elastomeric interface between the outer sleeve and the inner element, the elastomeric interface being bonded to the inner element and being rotatable with respect to the outer sleeve, the elastomeric interface having a nominal hardness in excess of Shore 60 D.

2. The bushing of claim 1 wherein the elastomeric interface is a polyurethane.

3. The bushing of claim 2 wherein the elastomer is a MDI-based polyether.

4. The bushing of claim 3 wherein the elastomer is amine-cured.

5. The bushing of claim 2 wherein the elastomeric interface has a hardness between 60 D and 80 D.

6. The bushing of claim 1 wherein the inner element is a pin, the elastomeric interface extending axially beyond the ends of the sleeve.

7. A bushing adapted for use in a heavy, over-the-road vehicle, the bushing comprising an outer sleeve, an inner element telescoped into the outer sleeve, and an elastomeric interface between the outer sleeve and the inner element, the elastomeric interface being bonded to one of the inner element and the outer sleeve and being rotatable with respect to the other of the inner element and the outer sleeve, the elastomeric interface having a nominal hardness in excess of Shore 60 D.

8. The bushing of claim 7 wherein the inner element is a shaft.

9. The bushing of claim 7 wherein the elastomer comprises a polyurethane.

10. The bushing of claim 9 wherein the elastomer is a MDI-based polyether.

11. The bushing of claim 10 wherein the elastomer is amine-cured.

12. The bushing of claim 7 wherein the elastomeric interface is a polyurethane having a hardness between Shore 60 D and Shore 80 D, the inner element having a diameter of at least one inch and the elastomeric interface having a thickness of from 0.1 to 0.3 inches, the elastomeric interface limiting conical movement of the inner element with respect to the outer element to no more than plus or minus one degree.

13. The bushing of claim 12 wherein the elastomeric interface extends axially beyond at least one end of the sleeve.

14. The bushing of claim 12 wherein the inner element is a solid metal pin, the pin having a channel in a central portion thereof for the elastomeric interface, the elastomeric interface being bonded to the channel.

15. The bushing of claim 7 wherein the elastomer is a polyurethane having a hardness between Shore 60 D and Shore 80 D, the elastomer forming the sole interface between the sleeve and the inner element, the elastomeric interface limiting conical movement of the inner element with respect to the outer element to no more than plus or minus one degree.

16. A replacement bushing for replacing a metal-on-metal bushing for heavy over-the-road vehicles, the metal-on-metal bushing comprising a metal outer sleeve and a metal inner element telescoped into the outer sleeve, the inner element having an outer bearing surface separated from an inner bearing surface of the outer sleeve by a film of grease, the replacement bushing comprising an outer sleeve, an inner element, and an elastomeric interface between the outer sleeve and the inner element, the elastomeric interface having a hardness greater than Shore 60 D, the interface being bonded to one of the inner element and outer sleeve and being rotatable with respect to the other of the outer sleeve and the inner element, the interface having an outer diameter substantially equal to the maximum diameter of the metal inner element of the metal-on-metal bushing.

17. The replacement bushing of claim 16 wherein the metal outer sleeve and metal inner element of the metal-on-metal bushing are threaded, and the replacement bushing includes an inner element having a portion with an outer diameter substantially equal to the root diameter of the thread on the inner element of the metal-on-metal inner element, and the outer sleeve of the replacement bushing has an inner diameter substantially equal to the root diameter of the thread on the outer sleeve, the interface filling the space between the inner element and the outer sleeve.

18. The replacement bushing of claim 16 wherein the metal inner element is slipped axially into the metal outer sleeve of the metal-on-metal bushing, wherein the replacement bushing includes an inner element having a central portion with an outer diameter from 0.1" to 0.4" less than the corresponding outer diameter of the inner element of the metal-on-metal inner element, and wherein the outer sleeve of the replacement bushing has an inner diameter substantially equal to the corresponding inner diameter of the outer sleeve of the metal-on-metal bushing, the interface filling the space between the inner element and the outer sleeve.

19. In combination, a leaf spring mounted in a heavy, over-the-road vehicle, the leaf spring comprising an eye part at one end thereof, and a bushing mounting the leaf spring to a chassis of the vehicle, the bushing comprising an outer sleeve having an outer surface fitted in the leaf spring eye, an inner element telescoped into the outer sleeve, and an elastomeric interface between the outer sleeve and the inner element, the elastomeric interface being bonded to one of the inner element and outer sleeve and being rotatable with respect to the other of the inner element and outer sleeve, the elastomeric interface having a nominal hardness in excess of Shore 60 D.

20. The combination of claim 19 wherein the elastomeric interface is made of polyurethane and is bonded to the inner element.

21. The combination of claim 19 wherein the elastomeric interface has a hardness between Shore 60 D and Shore 80 D.

22. The combination of claim 19 wherein the elastomeric interface extends axially beyond at least one end of the sleeve.

23. A method of mounting a bushing to a bracket on a heavy over-the-road vehicle, the bracket comprising a first arm and a second arm spaced from the arm, each of the first arm and the second arm including an opening, the bushing comprising a sleeve and a shaft telescoped into the sleeve, the method comprising a step of bonding an elastomer to one of the shaft or the sleeve, the elastomer having a hardness greater than Shore 60 D, a step of positioning the sleeve of the bushing between the arms of the bracket, and a step of inserting the shaft through the opening in the first arm of the bracket, through the sleeve of the bushing, and into the opening in the second arm of the bracket, the elastomer forming a snug, rotatable fit with the other of the sleeve and the shaft.

24. The method of claim 23 wherein the shaft is a pin, the method including a further step of securing the pin to the bracket.

25. The method of claim 24 including a step of mounting the sleeve of the bushing to a suspension component before positioning the sleeve between the arms of the bracket.

26. The method of claim 23 wherein the elastomer forms the sole interface between the sleeve and the shaft.

27. The method of claim 23 wherein the step of bonding the elastomer comprises bonding the elastomer to the shaft of the bushing, the step of inserting the shaft comprising inserting the shaft and elastomer through the opening in the first arm of the bracket and through the sleeve of the bushing to form a snug, rotatable fit with the sleeve.

28. The method of claim 23 wherein the component is an eye of a leaf spring, the shaft being a pin.

29. The method of claim 23 wherein the shaft is attached to an S-cam of a brake.

30. A method for replacing a metal-on-metal bushing for heavy over-the-road vehicles, the bushing comprising a metal outer sleeve and a metal inner element telescoped into the outer sleeve, the inner element having an outer bearing surface separated from an inner bearing surface of the outer sleeve by a film of grease, the method comprising replacing the metal-on-metal bushing with a bushing having an outer sleeve, an inner element, and a polyurethane interface with a hardness greater than Shore 60 D, the polyurethane interface being bonded to one of the outer sleeve and the inner element and being rotatable with respect to the other of the outer sleeve and, the inner element.

31. The method of claim 30 wherein the inner element of the replacement bushing has a maximum diameter within its outer sleeve which is smaller than the maximum diameter of the inner element of the metal-on-metal bushing, the inner element of the replacement blushing having portions extending axially outward from the outer sleeve, the axially outward extending portions having dimensions substantially the same as the dimensions of corresponding portions of the metal-on-metal bushing.

32. The method of claim 31 wherein the metal-on-metal bushing is threaded, and the replacement bushing includes an inner element having an outer diameter substantially equal to the root diameter of the thread on the inner element of the metal-on-metal inner element, and the outer sleeve of the replacement bushing has an inner diameter substantially equal to the root diameter of the thread on the outer sleeve, the polyurethane interface filling the space between the inner element and the outer sleeve.

* * * * *

UNITED STATES PATENT AND TRADEMARK OFFICE
CERTIFICATE OF CORRECTION

PATENT NO.   : 5,988,614
DATED        : November 23, 1999
INVENTOR(S)  : George R. Sturmon It is certified that error appears in the above-identified patent and that said Letters Patent is hereby corrected as shown below:

Col. 11, line 63
 replace "arm and a second arm spaced from the arm,"
 with --arm and a second arm spaced from the first arm,--.

Signed and Sealed this

Seventh Day of November, 2000

Attest:

Q. TODD DICKINSON

*Attesting Officer*           *Director of Patents and Trademarks*